(12) United States Patent
Naganuma et al.

(10) Patent No.: US 10,477,136 B2
(45) Date of Patent: Nov. 12, 2019

(54) DISPLAY MODE DETERMINING DEVICE, DISPLAY, DISPLAY MODE DETERMINING METHOD, AND NON-TRANSITORY STORAGE MEDIUM

(71) Applicant: JVC KENWOOD Corporation, Yokohama-shi, Kanagawa (JP)

(72) Inventors: Tatsumi Naganuma, Yokohama (JP); Hideki Takehara, Yokohama (JP); Akinori Suyama, Yokohama (JP); Satoru Hirose, Yokohama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 0 days.

(21) Appl. No.: 15/996,574

(22) Filed: Jun. 4, 2018

(65) Prior Publication Data

US 2019/0098249 A1 Mar. 28, 2019

(30) Foreign Application Priority Data

Sep. 26, 2017 (JP) .................................. 2017-184414

(51) Int. Cl.
*H04N 5/445* (2011.01)
*G06F 17/27* (2006.01)
*G10L 15/26* (2006.01)
*H04N 21/43* (2011.01)

(52) U.S. Cl.
CPC ......... *H04N 5/44513* (2013.01); *G06F 17/27* (2013.01); *G06F 17/2765* (2013.01); *G10L 15/265* (2013.01); *H04N 21/43* (2013.01); *H04N 2005/44526* (2013.01)

(58) Field of Classification Search
CPC ...... H04N 5/44513; H04N 2005/44526; G06F 17/2765; G10L 15/265
USPC .......................................................... 348/468
See application file for complete search history.

(56) References Cited

U.S. PATENT DOCUMENTS

| | | | | |
|---|---|---|---|---|
| 6,130,968 A | * | 10/2000 | McIan | G06F 3/14 345/56 |
| 2002/0133521 A1 | * | 9/2002 | Campbell | G06F 17/21 715/256 |
| 2009/0066722 A1 | * | 3/2009 | Kriger | G06Q 30/02 345/619 |
| 2017/0316708 A1 | * | 11/2017 | Harb | G09B 5/125 |

FOREIGN PATENT DOCUMENTS

JP 2015-018079 1/2015

* cited by examiner

*Primary Examiner* — Michael Lee
(74) *Attorney, Agent, or Firm* — Amin, Turocy & Watson LLP

(57) ABSTRACT

A display mode determining device includes a video data acquisition unit configured to acquire video data of a video including a voice, a database referring unit configured to refer to a database of use frequency of words in which use frequency information indicating use frequency of each word is stored, and a determining unit configured to, based on the video data acquired by the video data acquisition unit and based on the use frequency information referred to by the database referring unit, obtain the use frequency of each word included in text data representing the voice included in the video to determine display mode of the word according to the use frequency thereof.

3 Claims, 13 Drawing Sheets

| TEXT | THE REQUIRED TIME WILL BE SHORTENED SIGNIFICANTLY | | | |
|---|---|---|---|---|
| WORD | THE REQUIRED TIME | WILL BE | SHORTENED | SIGNIFICANTLY |
| USE FREQUENCY | HIGH | HIGH | HIGH | HIGH |
| DISPLAY PERIOD | 3 SECONDS | 3 SECONDS | 3 SECONDS | 3 SECONDS |

FIG.7

| TEXT | NEW XXX ROAD IS OPENED TO TRAFFIC | | | |
|---|---|---|---|---|
| WORD | NEW | XXX ROAD | IS | OPENED TO TRAFFIC |
| USE FREQUENCY | HIGH | LOW | - | HIGH |
| DISPLAY PERIOD | 3 SECONDS | 5 SECONDS | - | 3 SECONDS |

FIG.8

| TEXT | THE REQUIRED TIME WILL BE SHORTENED SIGNIFICANTLY | | | |
|---|---|---|---|---|
| WORD | THE REQUIRED TIME | WILL BE | SHORTENED | SIGNIFICANTLY |
| USE FREQUENCY | HIGH | HIGH | HIGH | HIGH |
| DISPLAY PERIOD | 3 SECONDS | 3 SECONDS | 3 SECONDS | 3 SECONDS |

DISPLAY MODE DETERMINING DEVICE, DISPLAY, DISPLAY MODE DETERMINING METHOD, AND NON-TRANSITORY STORAGE MEDIUM

CROSS-REFERENCE TO RELATED APPLICATION

The present application claims priority to and incorporates by reference the entire contents of Japanese Patent Application No. 2017-184414 filed in Japan on Sep. 26, 2017.

FIELD

The present application relates to a display mode determining device, a display, a display mode determining method, and a non-transitory storage medium.

BACKGROUND

For example, with advancement in natural language processing technology such as artificial intelligence (AI), voices recorded in a video can be converted into a text with a high degree of accuracy. The text obtained by conversion can then be used as subtitles of the video. However, the subtitles that are based on the text generated as a result of natural language processing have a lower degree of readability as compared to subtitles produced by a person. Thus, in that regard, there is room for improvement.

There is a known technology related to a subtitle generation device which generates subtitles that reduce sense of discomfort for users (for example, see Japanese Laid-open Patent Publication No. 2015-018079). In this technology, the sense of discomfort for the users is reduced by reflecting style of speaking of a person in the subtitles.

The voices recorded in a video include words that are frequently seen or heard and words that are hardly seen or heard or that are seen or heard for the first time. In a case of making subtitles for the words that are frequently seen or heard, the degree of readability is considered to be high. On the other hand, in a case of making subtitles for the words that are hardly seen or heard or that are seen or heard for the first time, the degree of readability is considered to be low. In this way, there is room for improvement of the readability of the subtitles.

SUMMARY

A display mode determining device, a display, a display mode determining method, and a non-transitory storage medium are disclosed.

According to one aspect of the present application, there is provided a display mode determining device comprising: a video data acquisition unit configured to acquire video data of a video including a voice; a database referring unit configured to refer to a database of use frequency of words in which use frequency information indicating use frequency of each word is stored; and a determining unit configured to, based on the video data acquired by the video data acquisition unit and based on the use frequency information referred to by the database referring unit, obtain the use frequency of each word included in text data representing the voice included in the video to determine display mode of the word according to the use frequency thereof.

According to one aspect of the present application, there is provided a display comprising: a display video data acquisition unit configured to acquire display video data of a display video including a voice and acquire text data representing the voice included in the display video; a subtitle generating unit configured to generate subtitle data of subtitle based on the text data acquired by the display video data acquisition unit; a display unit configured to display the display video data acquired by the display video data acquisition unit and the subtitle data generated by the subtitle generating unit; and a display controller configured to perform control so that the display unit displays the display video data acquired by the display video data acquisition unit and the subtitle data generated by the subtitle generating unit, wherein the display controller is further configured to perform the control so that the display unit displays the subtitle data with a different display mode according to use frequency of each word included in the subtitle data based on a database of use frequency of words in which use frequency information indicating the use frequency of each word is stored.

According to one aspect of the present application, there is provided a display mode determining method comprising: acquiring video data of a video including a voice; referring to a database of use frequency of words in which use frequency information indicating use frequency of each word is stored; and obtaining, based on the video data acquired at the acquiring and based on the use frequency information referred to at the referring, the use frequency of each word included in text data representing the voice included in the video, and determining display mode of the word according to the use frequency thereof.

According to one aspect of the present application, there is provided a non-transitory storage medium that stores a computer program for causing a computer to execute; acquiring video data of a video including a voice; referring to a database of use frequency of words in which use frequency information indicating use frequency of each word is stored; and obtaining, based on the video data acquired at the acquiring and based on the use frequency information referred to at the referring, the use frequency of each word included in text data representing the voice included in the video, and determining display mode of the word according to the use frequency thereof.

The above and other objects, features, advantages and technical and industrial significance of this application will be better understood by reading the following detailed description of presently preferred embodiments of the application, when considered in connection with the accompanying drawings.

BRIEF DESCRIPTION OF THE DRAWINGS

FIG. 7 is a diagram illustrating an example of display periods determined by the display mode determining device of the display system according to the first embodiment;

FIG. 8 is a diagram illustrating another example of the display periods determined by the display mode determining device of the display system according to the first embodiment;

DETAILED DESCRIPTION OF THE PREFERRED EMBODIMENTS

Preferred embodiments of a display mode determining device, a display, a display mode determining method, and a non-transitory storage medium according to the present application are described below in detail with reference to the accompanying drawings. However, the present application is not limited by the embodiments described below.

First Embodiment

Figure 1:
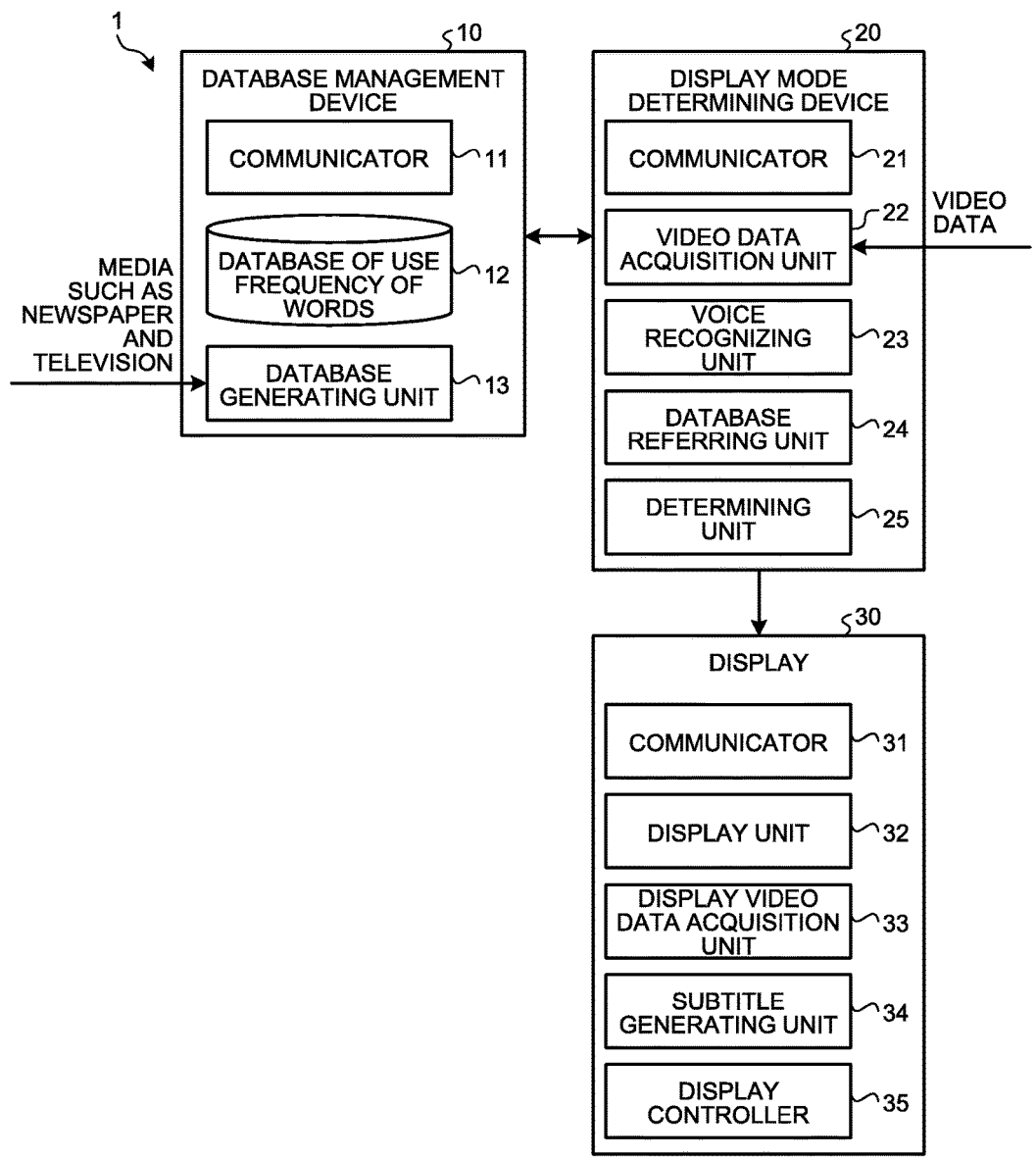
FIG. 1 is a block diagram illustrating an exemplary configuration of a display system including a display mode determining device according to a first embodiment.

FIG. 1 is a block diagram illustrating an exemplary configuration of a display system according to a first embodiment. A display system 1 determines display mode of each word according to use frequency of that word in voices recorded in a video. A display system 1 includes a database management device 10, a display mode determining device 20, and a display 30.

The database management device 10 manages a database that is used in process of the display system 1. For example, the database management device 10 is installed in equipment of a video content distribution agency. The database management device 10 is an arithmetic processing device (controller) configured with a central processing unit (CPU) or a video processor. The database management device 10 loads computer programs, which are stored in a memory unit (not illustrated), into a memory and executes commands written in the computer programs. The database management device 10 can be configured using one or more devices. The database management device 10 includes a communicator 11, a database of use frequency of words (hereinafter, simply referred to as a "database") 12, and a database generating unit 13. Thus, the database management device 10 manages the database 12.

The communicator 11 performs wired communication or wireless communication with the display mode determining device 20. The communicator 11 sends data to and receives data from the display mode determining device 20.

Figure 2:
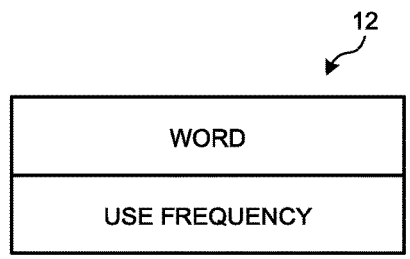
FIG. 2 is a diagram illustrating an exemplary configuration of a database of use frequency of words according to the first embodiment.

Explained with reference to FIG. 2 is the database 12. FIG. 2 is a diagram illustrating an exemplary configuration of a database of use frequency of words according to the first embodiment. The database 12 is used to store use frequency information that indicates the use frequency of each word. Herein, the words are mainly nouns or verbs, and are assumed to exclude particles and conjunctions. The use frequency information comprises, for example, information indicating the use frequency of each word in the information that is publicly available via information media such as newspapers, television, and radio or via the Internet including homepages and social network services (SNS). The use frequency is expressed using "high" and "low" levels or expressed using use count. In the first embodiment, the use frequency is expressed using "high" and "low" levels. For example, commonly-used words correspond to a use frequency of "high" level. Moreover, for example, words that are not commonly used correspond to the use frequency of "low" level. Furthermore, the use frequency may be defined to be "high" level when the use frequency is equal to or larger than a predetermined value and to be "low" level when the use frequency is smaller than the predetermined value.

The database generating unit 13 creates the database 12. More specifically, the database generating unit 13 obtains the use frequency of each word based on, for example, the information available in the information media or the Internet, and stores the use frequency in the database 12. Moreover, the database generating unit 13 updates the database 12 according to, for example, updating frequency of the information in the information media or the Internet.

The display mode determining device 20 obtains the use frequency of each word included in text data that represents voices recorded in a video, and determines the display mode of each word according to the corresponding use frequency. For example, the display mode determining device 20 is installed in equipment of a distribution agency. The display mode determining device 20 is an arithmetic processing device (controller) configured with a central processing unit (CPU) or a video processor. The display mode determining device 20 loads computer programs, which are stored in a memory unit (not illustrated), into a memory and executes commands written in the computer programs. The display mode determining device 20 can be configured using one or more devices. In the first embodiment, the display mode determining device 20 includes a communicator 21, a video data acquisition unit 22, a voice recognizing unit 23, a database referring unit 24, and a determining unit 25.

The communicator 21 performs wired communication or wireless communication with the database management device 10 and the display 30. The communicator 21 sends data to and receives data from the database management device 10 and the display 30.

The video data acquisition unit 22 acquires video data of a video including voices. Then, the video data acquisition unit 22 outputs the acquired video data to the voice recognizing unit 23.

The video data represents data of a video. In the video data, a video from a start of recording to an end of recording is treated as a single unit. For example, the video data is a moving image comprising images with few tens of frames per second.

The voice data represents data of voices recorded in a video. For the single unit of the video data corresponds to one or more sets of the voice data. However, in the first embodiment, the single unit of the video data corresponds to a single set of the voice data. The voice data can be delimited, for example, according to a change of a speaker or a photographic subject or according to punctuation points, ending of words, or silence portions.

The voice recognizing unit 23 performs a voice recognition process for recognizing the voices recorded in the video acquired by the video data acquisition unit 22, and generates text data representing the voices. There is no restriction on a method of voice recognition, and any known method can be implemented. The voice recognizing unit 23 adds the generated text data to the video data, and then outputs the video data to the determining unit 25.

The text data is data of the text representing the voices recorded in the video. In other words, the text data is character information to be used for generating subtitles corresponding to the voices. The text data includes two types, namely, one being obtained by transcribing the voices without modification and the other being obtained by interpreting the voices and then transcribing the interpretation result. The single unit of the voice data corresponds to one or more sets of the text data. In the first embodiment, the text data is generated for each delimited portion.

The text data contains display timing information indicating a timing of starting the display thereof and a timing of ending the display thereof according to the video and the voices. For example, the display timing information is indicated using an elapsed time from the start timing of the video and the voices, or using a number of frames with an initial frame of the video serving as a first frame, or using stamp position information provided in the video data.

Figure 3:
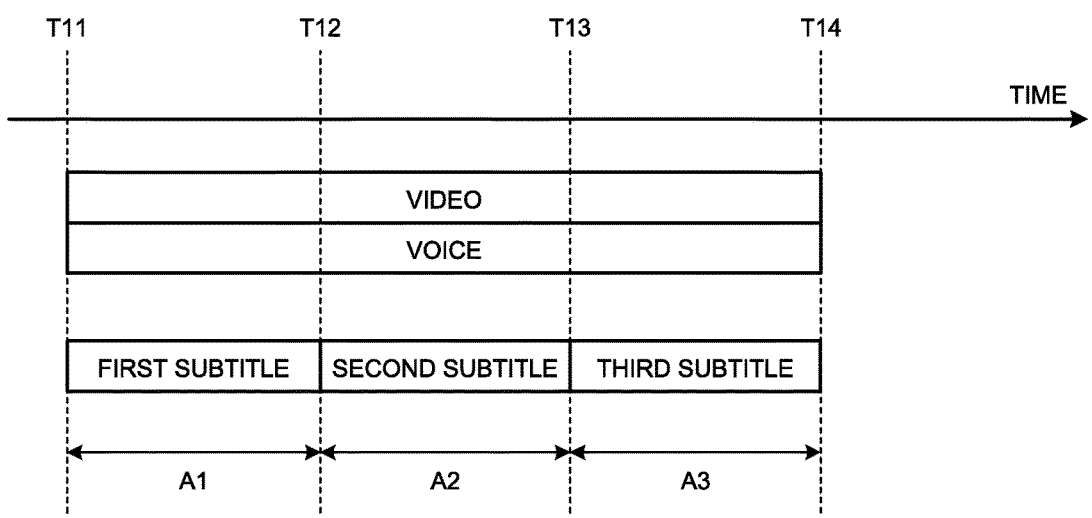
FIG. 3 is a diagram for explaining an example of the display timings of subtitles generated/displayed in a display system according to the first embodiment.
Figure 4:
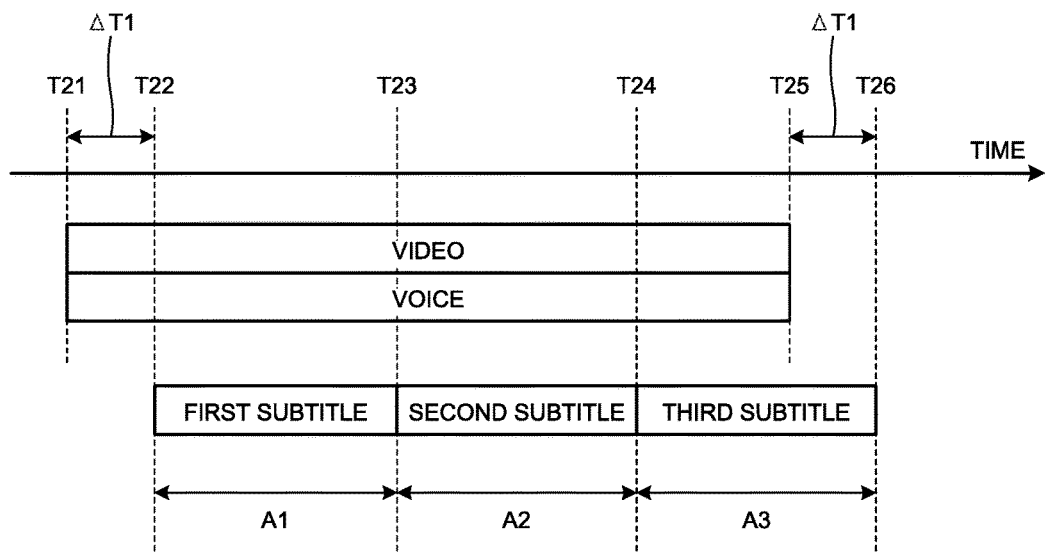
FIG. 4 is a diagram for explaining another example of the display timings of the subtitles generated/displayed in the display system according to the first embodiment.

Explained below with reference to FIGS. 3 and 4 is the display timing. FIG. 3 is a diagram for explaining an example of the display timings of the subtitles generated/displayed in the display system according to the first embodiment. FIG. 4 is a diagram for explaining another example of the display timings of the subtitles generated/displayed in the display system according to the first embodiment.

As illustrated in FIG. 3, for example, in a case of generating ex-post facto subtitles with respect to broadcast of an already-taken video such as a recorded television program, it is desirable that the display timings are matched to reproduction timings of the corresponding voices. In the example illustrated in FIG. 3, the first subtitle has a display timing from a timing T11 to a timing T12, and has a display period of A1. The second subtitle has a display timing from the timing T12 to a timing T13, and has a display period of A2. The third subtitle has a display timing from the timing T13 to a timing T14, and has a display period of A3.

As illustrated in FIG. 4, for example, in a case of generating the subtitles in real time with respect to a taken video as in a case of a live television program, since it requires time to generate the subtitles, the display timings are delayed by a delay period ΔT1 from the reproduction timings of the corresponding voices. In the example illustrated in FIG. 4, the first subtitle has a display timing from a timing T22 to a timing T23, and has a display period of A1. The timing T22 is delayed by the delay period ΔT1 from a timing T21 at which the reproduction of the video and the voices starts. The second subtitle has a display timing from the timing T23 to a timing T24, and has a display period of A2. The third subtitle has a display timing from the timing T24 to a timing T26, and has a display period of A3. The timing T26 is delayed by the delay period ΔT1 from a timing T25 at which the reproduction of the video and the voices ends.

The delay period ΔT1 is set to be equal to or longer than a period of time required for process of generating text data from the voices recorded in the video. For example, the delay period ΔT1 is set to be around few tens of seconds.

Moreover, in the first embodiment, the voice recognizing unit 23 detects delimitations of the voices and adds delimitation position information to the text data. For example, the voice recognizing unit 23 can detect the delimitations of the voices by recognizing a change of a speaker. Alternatively, for example, the voice recognizing unit 23 can detect the delimitations of the voices by recognizing punctuation points, ending of words, or silence portions. Still alternatively, for example, the voice recognizing unit 23 can detect the delimitations of the voices by recognizing the delimitations of the video as a result of performing video analysis for recognizing a change in a photographic subject.

The delimitation position information indicates possible positions for delimitation in the text data. In other words, the delimitation position information can be used as delimitation positions for subtitles on generating the subtitles based on the text data.

The database referring unit 24 refers to the database 12 of the database management device 10. More specifically, the database referring unit 24 refers to the use frequency information in the database 12 and obtains the use frequency of each word included in the text data.

The determining unit 25 obtains, based on the text data generated by the voice recognizing unit 23 from the video data acquired by the video data acquisition unit 22 and based on the use frequency information referred to by the database referring unit 24, the use frequency of each word included in the text data representing the voices recorded in the video to determine a display mode of each word according to the corresponding use frequency. The determining unit 25 determines the display mode in such a manner that a degree of readability of words with a low use frequency is improved. That is because of the fact that uncommon or unfamiliar words with a low use frequency have a lower degree of readability than common or familiar words with a high use frequency. Then, the determining unit 25 adds, to the text data, the display mode information indicating the display mode for each word as the determination result.

The display mode comprises at least one of a display period of the word, a display color of the word, a display size of the word, and a display speed of the word. When the display mode is the display periods of the words, the display periods of the words with a low use frequency are set to be longer than the display periods of the words with a high use frequency. When the display mode is the display color of the word, the display color of the word with a low use frequency is set to have higher legibility than the display color of the word with a high use frequency. When the display mode is the display size of the word, the display size of the word with a low use frequency is set to be larger than the display size of the word with a high use frequency. When the display mode is the display speed of the word, the display speed of the word with a low use frequency is set to be slower than the display speed of the word with a high use frequency. Regarding the display speed of the word, the explanation is given later.

In the first embodiment, the display mode is the display period of the word. For example, the display period can be the number of seconds. For example, the display periods can be information for lengthening the display periods of the respective words. In the first embodiment, the display period is the number of seconds. In the first embodiment, the word with a high use frequency is set to have the display period of "three seconds", and the word with a low use frequency is set to have the display period of "five seconds".

In the first embodiment, the determining unit 25 extracts the words included in the text data generated by the voice recognizing unit 23. Then, the determining unit 25 obtains the use frequency of each word based on the text data and the use frequency information. Subsequently, the determining unit 25 determines the display period of each word according to the corresponding use frequency. In the first embodiment, the determining unit 25 determines the display periods in such a manner that the word with a low use frequency has a longer display period than the word with a high use frequency. Then, the determining unit 25 adds the display period of each word as display period information to the text data.

Moreover, the determining unit 25 can also determine the display period of the entire text data. In the first embodiment, the determining unit 25 determines the display periods of the entire text data in such a manner that the entire text data containing the words with a low use frequency has a longer display period than the entire text data containing the words with a high use frequency. For example, the longest display period of the word in the text data can be set as the display period of the entire text data. Then, the determining unit 25 adds the display period of the text data as the display period information to the text data.

Furthermore, when the text data contains the delimitation position information, the determining unit 25 can determine the display periods of the text data delimited at the delimitation positions. Then, the determining unit 25 adds the display periods of the text data, which are delimited at the delimitation positions, as the display period information to the text data.

The display 30 displays/reproduces the video, which includes the voices, along with the subtitles. The display 30 is an arithmetic processing device (controller) configured with a central processing unit (CPU) or a video processor. The display 30 loads computer programs, which are stored in a memory unit (not illustrated), into a memory and executes commands written in the computer programs. The display 30 can be configured using one or more devices. The display 30 includes a communicator 31, a display unit 32, a display video data acquisition unit 33, a subtitle generating unit 34, and a display controller 35.

The communicator 31 performs wired communication or wireless communication with the display mode determining device 20. The communicator 31 receives display video data from the display mode determining device 20.

The display unit 32 is capable of displaying the video and the subtitles. Examples of the display unit 32 include a liquid crystal display (LCD) and an organic electro-luminescence (organic EL). The display unit 32 displays the video and the subtitles based on the video signals output from the display controller 35.

The display video data acquisition unit 33 acquires the display video data from the display mode determining device 20. Then, the display video data acquisition unit 33 outputs the acquired display video data to the subtitle generating unit 34 and the display controller 35.

Figure 5:
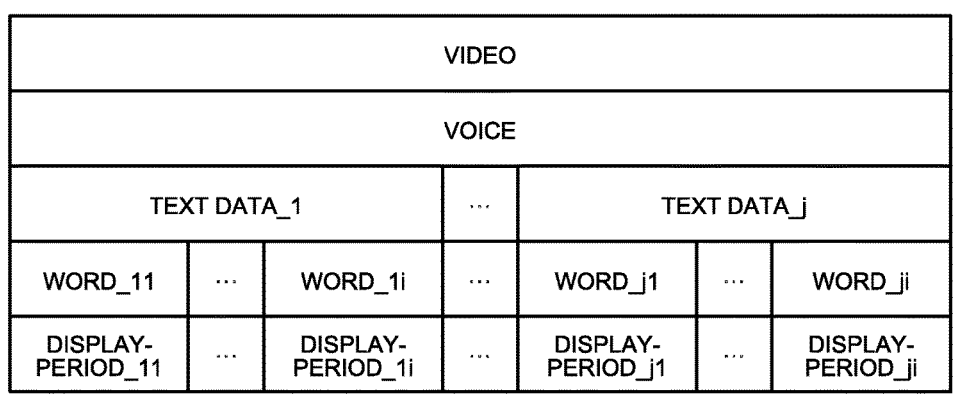
FIG. 5 is a diagram illustrating an example of display video data generated by the display mode determining device of the display system according to the first embodiment.

Explained below with reference to FIG. 5 is the display video data. FIG. 5 is a diagram illustrating an example of the display video data generated by the display mode determining device of the display system according to the first embodiment. The display video data contains, for example, the video data, the voice data, the text data, and the display period information. In the example illustrated in FIG. 5, a single unit of the display video data contains sets of text data from text-data_1 to text-data_j. Moreover, as the display period information, the display video data contains words from a word_11 to a word_1i included in the text-data_1 along with respective display periods from a display-period_11 to a display-period_1i, and contains words from a word_j1 to a word_ji included in the text-data_j along with respective display periods from a display-period_j1 to a display-period_ji.

The subtitle generating unit 34 generates subtitle data based on the display video data acquired by the display video data acquisition unit 33. In the first embodiment, the subtitle data represents data for displaying the text data in a row. In addition to character information and the display period information corresponding to the text data, the subtitle data can also contain at least one of font, the display size, the display color, and the display speed. When the text data contains the delimitation position information, the subtitle generating unit 34 can generate subtitle data for the delimited text data. The subtitle generating unit 34 can generate the subtitle data by delimiting the text data or partitioning the text data into a plurality of rows according to screen size of the display unit 32.

The display controller 35 performs control to display the video display data, which is acquired by the display video data acquisition unit 33, and the subtitle data, which is generated by the subtitle generating unit 34, in the display unit 32. More specifically, the display controller 35 displays, in the display unit 32, the display video included in the display video data and the character information included in the subtitle data. When the subtitle data contains the delimitation position information, the display controller 35 can display the subtitles delimited based on the delimitation position information. Moreover, the display controller 35 can display the subtitles by delimiting the text data or partitioning the text data into a plurality of rows according to the size of the display unit 32.

Given below is an explanation of processes performed in the database management device 10.

In the database management device 10, the database generating unit 13 generates the database 12. Moreover, in the database management device 10, the database generating unit 13 obtains the use frequency of each word based on the information that is publicly available via the information media or the Internet, and stores the use frequency of each word in the database 12. Furthermore, in the database management device 10, for example, the database generating unit 13 updates the database 12 according to the updating frequency of the information in the information media or the Internet.

Figure 6:
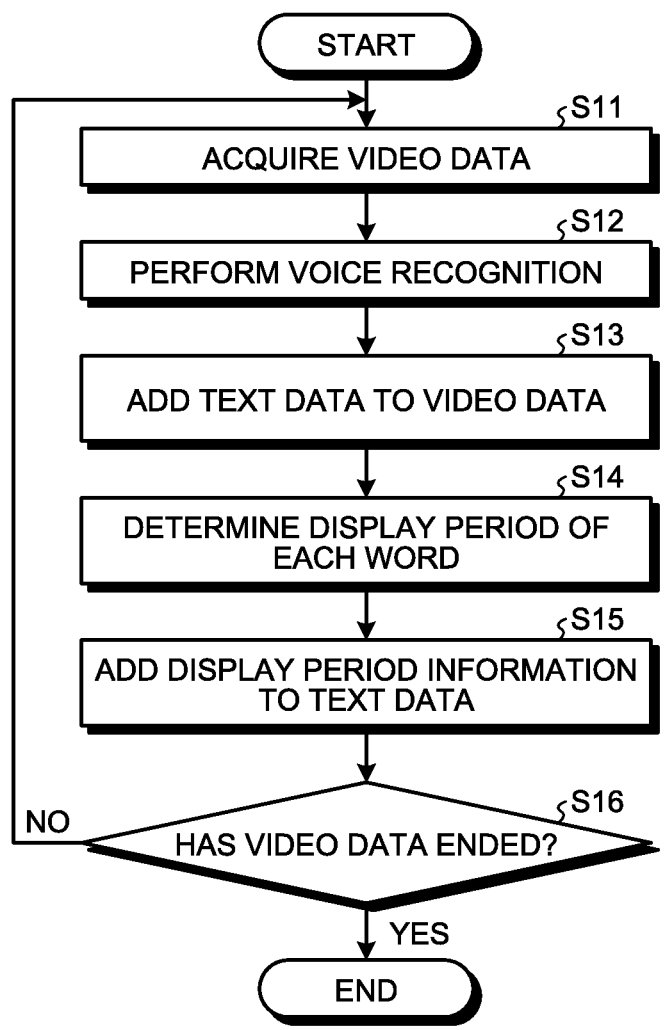
FIG. 6 is a flowchart for explaining an example of processes by the display mode determining device of the display system according to the first embodiment.

Explained below with reference to FIG. 6 is a method and an action of the processes performed by the display mode determining device 20. FIG. 6 is a flowchart for explaining an example of the processes performed by the display mode determining device of the display system according to the first embodiment.

In the display mode determining device 20, the video data acquisition unit 22 acquires video data (Step S11).

In the display mode determining device 20, the voice recognizing unit 23 performs a voice recognition operation with respect to the video data (Step S12). More specifically, in the display mode determining device 20, the voice recognizing unit 23 performs a voice recognition operation with respect to the video data and generates text data representing the voices recorded in the video. In the first embodiment, the text data contains the display timing information and the delimitation position information.

The display mode determining device 20 adds the text data to the video data (Step S13).

The display mode determining device 20 determines the display period of each word (Step S14). More specifically, in the display mode determining device 20, the determining unit 25 extracts the words included in the text data generated by the voice recognizing unit 23. Then, in the display mode determining device 20, the determining unit 25 obtains the use frequency of each word based on the text data and the use frequency information. Subsequently, in the display mode determining device 20, the determining unit 25 determines the display period of each word according to the corresponding use frequency. In the first embodiment, in the display mode determining device 20, the determining unit 25 determines the display periods of the texts delimited at the delimitation positions.

The display mode determining device 20 adds the display period information to the text data (Step S15). More specifically, in the display mode determining device 20, the determining unit 25 adds the display period of each word as the display period information to the text data. In the first embodiment, in the display mode determining device 20, the determining unit 25 adds, to the text data, the display period information containing the display periods of the texts delimited at the delimitation positions.

The display mode determining device 20 determines whether or not the video data has ended (Step S16). When it is determined that the video data has ended (Yes at Step S16), then the display mode determining device 20 ends the processes. When it is determined that the video data has not ended (No at Step S16), then the display mode determining device 20 again performs the processes from Step S11.

Explained below with reference to FIGS. 7 and 8 are the processes performed by the display mode determining device 20. FIG. 7 is a diagram illustrating an example of the display periods determined by the display mode determining device of the display system according to the first embodiment. FIG. 8 is a diagram illustrating another example of the display periods determined by the display mode determining device of the display system according to the first embodiment.

For example, an explanation is given for a case in which a voice "New XXX road is opened to traffic. The required time will be shortened significantly" is included in the video. At Step S11, the video data is acquired. At Step S12, the voice recognition operation is performed, and text data representing the voice is generated. In the first embodiment, the silent portion is recognized, and two sets of text data delimited into "New XXX road is opened to traffic" and "The required time will be shortened significantly" are generated. Moreover, the display timing information for the two sets of text data is generated. Furthermore, the delimitation position information of the silent portion is generated as the delimitation position. At Step S13, the text data containing the display timing information and the limitation position information is added to the video data.

At Step S14, regarding the text data "New XXX road is opened to traffic", the display period of each word is determined. More specifically, firstly, as illustrated in FIG. 7, the following words are extracted from the text data: "New", "XXX road", "is", "opened to traffic". Then, using the database referring unit 24, the use frequency of each word is obtained from the database 12. Regarding the words "New" and "opened to traffic", the use frequency of "high" is obtained. Regarding the word "XXX road", the use frequency of "low" is obtained. Then, the display period of "three seconds" is determined for the words with a high use frequency, and the display period of "five seconds" is determined for the words with a low use frequency.

Regarding the text data "the required time will be shortened significantly", the display period according to the use frequency of the words are determined in an identical manner as illustrated in FIG. 8.

Moreover, based on the determined display period of each word, the display period of the entire text data can be determined and added to the text data. In the first embodiment, the longest display period of the words in the text data can be set as the display period of the entire text data. In this case, the display period of "five seconds" is determined for the entire text data illustrated in FIG. 7, and the display period of "three seconds" is determined for the entire text data illustrated in FIG. 8.

At Step S15, the determined display period information is added to the text data, and the display video data is generated.

In this way, the display mode determining device 20 determines the display periods according to the use frequency of each word in the text data corresponding to the voices recorded in the video.

Regarding the display periods of the words, the explanation is as given above. The following explanation is given for the display speed of the word. The display speed of a word represents an amount of change per unit time in a position of the text that includes the word displayed in the display unit 32. For example, in a case of displaying a text in the display unit 32, it is possible to display the text while moving it from the right-hand side to the left-hand side. In this regard, the determining unit 25 extracts the words included in the text data generated by the voice recognizing unit 23. Then, based on the text data and the use frequency information, the determining unit 25 obtains the use frequency of each word. Subsequently, the determining unit 25 determines the display speed of each word according to the corresponding use frequency. That is, for example, via the database referring unit 24, the determining unit 25 obtains the use frequency of "high" for the words "New" and "opened to traffic", and obtains the use frequency of "low" for the word "XXX road". Then, the determining unit 25 determines the display speed of "normal" for the words with a high use frequency, and determines the display speed of "slow" for the words with a low use frequency. Subsequently, the determining unit 25 sets the lowest display speed of the words included in the text data as the display speed of the text data. Moreover, based on the determined display speed of each word, the determining unit 25 determines the display speed of the text data and adds it to the text data. In the example illustrated in FIG. 7, the display speed of the text data is determined to be "slow". In the example illustrated in FIG. 8, the display speed of the text data is determined to be "normal". In this regard, the display speed of "normal" of the text data implies that, for example, the period of time from a starting time in which the text of the subtitles comes in at one end of the screen to an ending time in which the text thereof runs out at the other end amounts to three seconds; and the display speed of "slow" of the text data implies that the abovementioned period of time amounts to five seconds.

Figure 9:
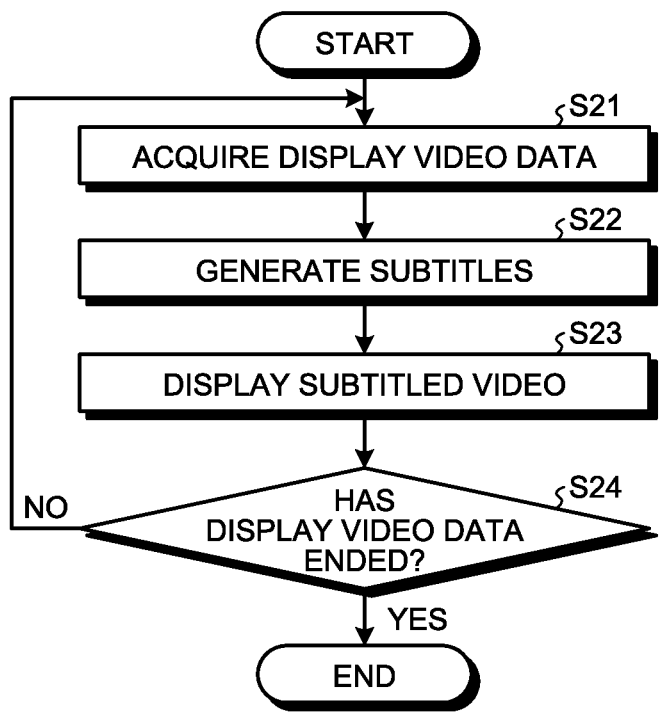
FIG. 9 is a flowchart for explaining an example of the processes by the display of the display system according to the first embodiment.

Explained below with reference to FIG. 9 is a method and an action of processes performed by the display 30. FIG. 9 is a flowchart for explaining an example of the processes performed by the display of the display system according to the first embodiment.

In the display 30, the display video data acquisition unit 33 acquires the display video data (Step S21).

In the display 30, the subtitle generating unit 34 generates the subtitles (Step S22). More specifically, in the display 30, the subtitle generating unit 34 generates subtitle data based on the text data included in the display video data. In the first embodiment, the subtitles are used to display the text data without modification. Moreover, when the text data included in the display video data contains the delimitation position information, the subtitle generating unit 34 of the display 30 can generate subtitle data that is delimited based on the delimitation position information. In the display 30, the subtitle generating unit 34 can generate the subtitle data that is delimited according to, for example, the size of the display unit 32.

The display controller 35 of the display 30 displays the subtitled video in the display unit 32 (Step S23). More specifically, the display controller 35 of the display 30 displays the display video data and the subtitle data based on the display timing information.

The display 30 determines whether or not the display video data has ended (Step S24). When it is determined that display video data has ended (Yes at Step S24), then the display 30 ends the processes. When it is determined that the display video data has not ended (No at Step S24), then the display 30 again performs the processes from Step S21.

Explained below with reference to FIGS. 3 and 4 are the processes performed by the display 30.

Explained below with reference to FIG. 3 is, for example, the display timings of the subtitles in a case of broadcasting a recorded television program. The display/reproduction of the video, the voice, and the first subtitle starts at the timing T11. At the timing T12, the display of the first subtitle ends, and the display of the second subtitle starts. At the timing T13, the display of the second subtitle ends, and the display of the third subtitle starts. At the timing T14, the display/reproduction of the video, the voice, and the third subtitle ends. In this way, in the case of broadcasting the recorded television program, the video, the voice, and the subtitles are displayed/reproduced without any time lag.

Explained below with reference to FIG. 4 is, for example, the display timings of the subtitles in a case of a live television program. The display/reproduction of the video and the voice starts at the timing T21. Then, at the timing T22 that is delayed by the delay period ΔT1 from the timing T21, the display of the first subtitle starts. At the timing T23, the display of the first subtitle ends, and the display of the second subtitle starts. At the timing T24, the display of the second subtitle ends, and the display of the third subtitle starts. At the timing T25, the display/reproduction of the video and the voice ends. At the timing T26 that is delayed by the delay period ΔT1 from the timing T25, the display/reproduction of the third subtitle ends. In this way, in the case of the live television program, the subtitles are displayed/reproduced by the delay period ΔT1 with respect to the video and the voice.

In this way, using the display mode determining device 20, the display 30 displays the subtitles with the display periods determined according to the use frequency of each word.

In this way, for example, the display mode determining device 20 that is installed in equipment of a video content distribution agency determines the display period of each word according to the corresponding use frequency in the voices recorded in the video, and distributes the display video data to the display 30 of the viewer of the video. The display 30 generates the subtitles based on the determined display periods, and displays the subtitles along with the video.

As described above, in the first embodiment, for each word in the text data that corresponds to the voices in the video, the display period is determined according to the use frequency of that word. Moreover, in the first embodiment, subtitles are generated based on the determined display periods and are then displayed. According to the first embodiment, the subtitles that include words with a low use frequency can be set to have longer display periods than the display periods of the subtitles that include the words with only a high use frequency. In this way, in the first embodiment, it becomes possible to improve the readability of the subtitles that include uncommon or unfamiliar words with a low use frequency.

Second Embodiment

Figure 10:
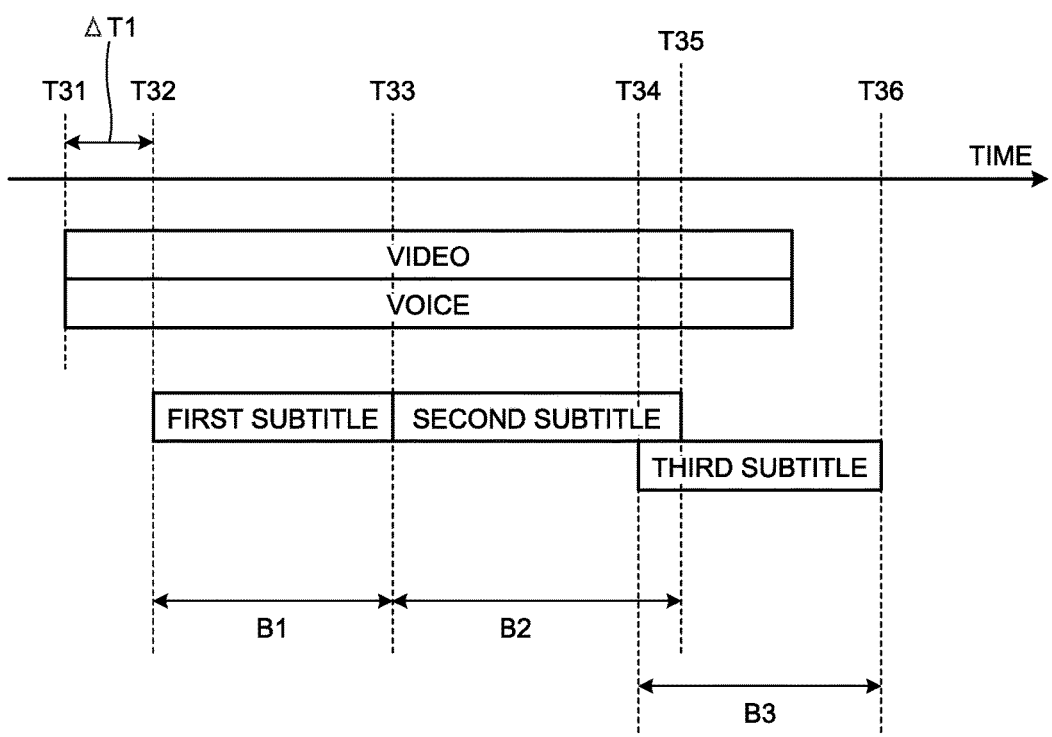
FIG. 10 is a diagram for explaining an example of the display timings of the subtitles generated/displayed by the display system according to a second embodiment.
Figure 11:
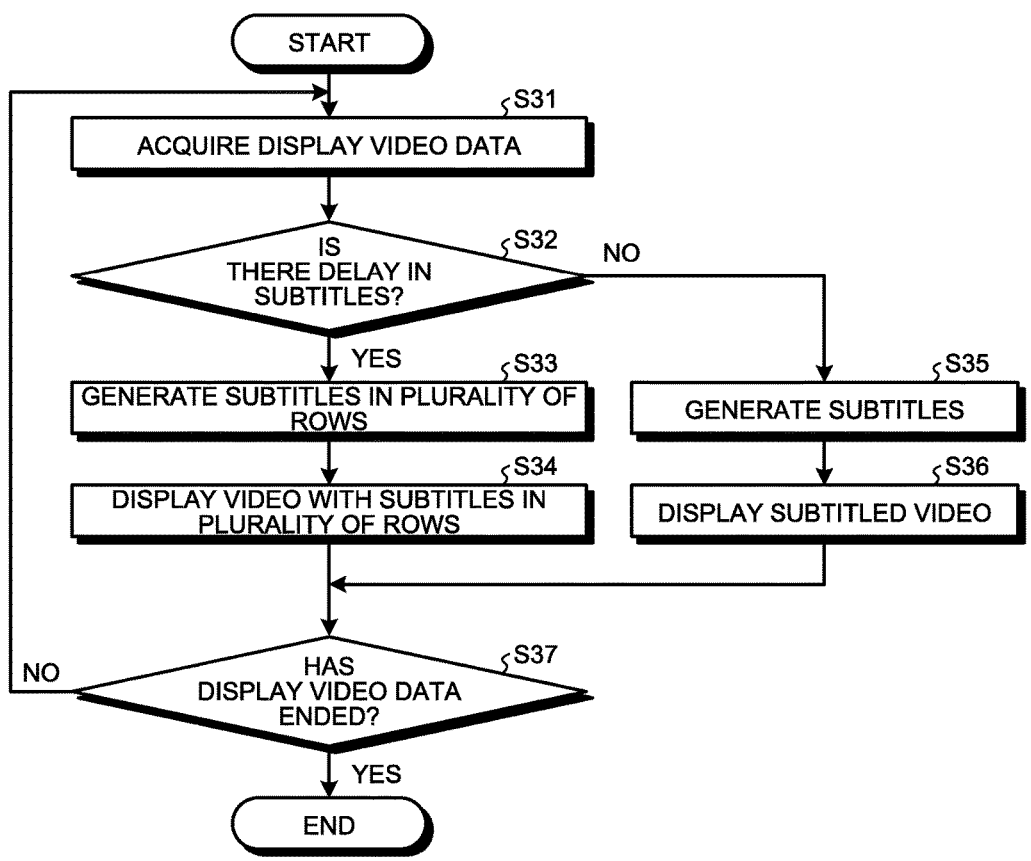
FIG. 11 is a flowchart for explaining an example of the processes by the display of the display system according to the second embodiment.

Explained below with reference to FIGS. 10 and 11 is the display system 1 according to a second embodiment. FIG. 10 is a diagram for explaining an example of the display timings of the subtitles generated/displayed by the display system according to the second embodiment. FIG. 11 is a flowchart for explaining an example of the processes performed by the display of the display system according to the second embodiment. Herein, the display system 1 has an identical fundamental configuration to the display system 1 according to the first embodiment. In the following explanation, the constituent elements identical to the constituent elements of the display system 1 are referred to by the same or corresponding reference numerals, and their detailed explanation is not given again. In the display system according to the second embodiment, the processes performed by the subtitle generating unit 34 of the display 30 are different from the processes according to the first embodiment.

Based on the display timing information and the display period information of the text data, when it is determined that the subtitles would be delayed, the subtitle generating unit 34 generates subtitle data in such a manner that a plurality of subtitles is displayed. In the second embodiment, when it is determined that the subtitles would be delayed, subtitle data is generated in such a manner that a plurality of subtitles is displayed in a plurality of rows.

In this regard, a delay in subtitles includes at least a partial overlapping of the display timing of one subtitle and the display timing of another subtitle. Alternatively, a delay in subtitles includes a case in which the display period of the subtitles exceeds a predetermined displayable period for the subtitles with respect to the reproduction period of the video and the voices, or includes a case in which the display timing of the subtitle is shifted by value equal to or greater than a threshold value with respect to the video and the voices. In the second embodiment, a delay in subtitles includes that the display period of the previous subtitle has not ended at the display timing of the following subtitle.

Explained below with reference to FIG. 10 is a delay in subtitles. As an example, an explanation is given for the display timings of the subtitles in a case of a live television program. In FIG. 10 is illustrated an example in which the second subtitle includes words with a low use frequency and has a display period B2 set to be longer than display periods B1 and B3, thereby resulting in a delay in subtitles. A timing T32 is delayed by the delay period ΔT1 from a timing T31 at which the reproduction of the video and the voices starts. The first subtitle has the display period represented by the display period B1 from the timing T32 to a timing T33. The second subtitle has the display period represented by the display period B2 from the timing T33 to a timing T35. The third subtitle has the display period represented by the display period B3 from a timing T34, which is earlier than the timing T35, to a timing T36. Thus, there is a partial overlapping of the display timings of the second and third subtitles.

In the flowchart illustrated in FIG. 11, the processes performed at Step S31 and Steps S35 to S37 are identical to the processes performed at Step S21 and Steps S22 to S24, respectively, in the flowchart illustrated in FIG. 9.

The display 30 determines whether or not there is a delay in the subtitles (Step S32). When there is at least a partial overlapping of the display timing of one subtitle and the display timing of another subtitle, the display 30 determines that there is a delay in the subtitles (Yes at Step S32), and the system control proceeds to Step S33. When there is no overlapping of the display timing of one subtitle and the display timing of another subtitle, the display 30 determines that there is no delay of in the subtitles (No at Step S32), and the system control proceeds to Step S35.

When it is determined that there is a delay in the subtitles (Yes at Step S32), the subtitle generating unit 34 of the display 30 generates the subtitles in a plurality of rows (Step S33). More specifically, the subtitle generating unit 34 of the display 30 generates such subtitle data that the subtitles determined to have the overlapping display timings are displayed in two rows. In the example illustrated in FIG. 10, the subtitle data in which the second and third subtitles are displayed in two rows is generated at the display timing of the third subtitle.

The display controller 35 of the display 30 displays the video with a plurality of rows of the subtitles in the display unit 32 (Step S34). More specifically, the display controller 35 of the display 30 displays the display video data and a plurality of sets of the subtitle data according to the display timing information.

As described above, in the second embodiment, when there is a delay in subtitles, a plurality of subtitles is displayed. Thus, in the second embodiment, it becomes possible to prevent a delay in the display of the subtitles due to making the display periods of the words with a low use frequency to be longer than the display periods of the words with a high use frequency. Moreover, in the second embodiment, as a result of displaying a plurality of subtitles, it becomes possible to maintain the readability. According to the second embodiment, since each subtitle is displayed for the corresponding determined display period along with displaying the video, the readability of each subtitle can be maintained.

Third Embodiment

Figure 12:
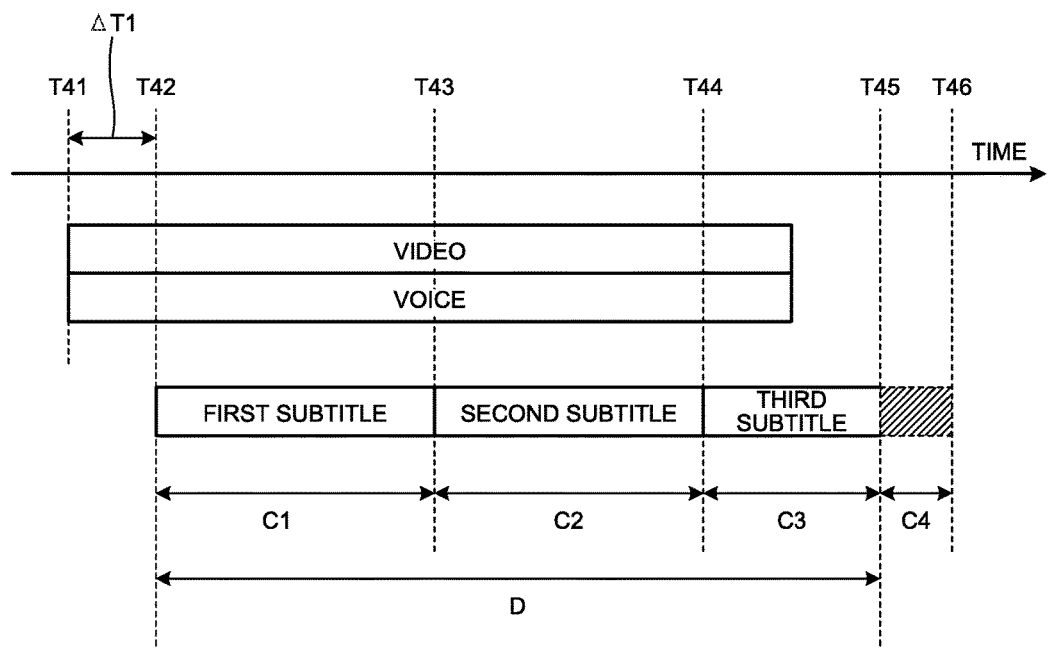
FIG. 12 is a diagram for explaining an example of the display timings of the subtitles generated/displayed by the display system according to a third embodiment.
Figure 13:
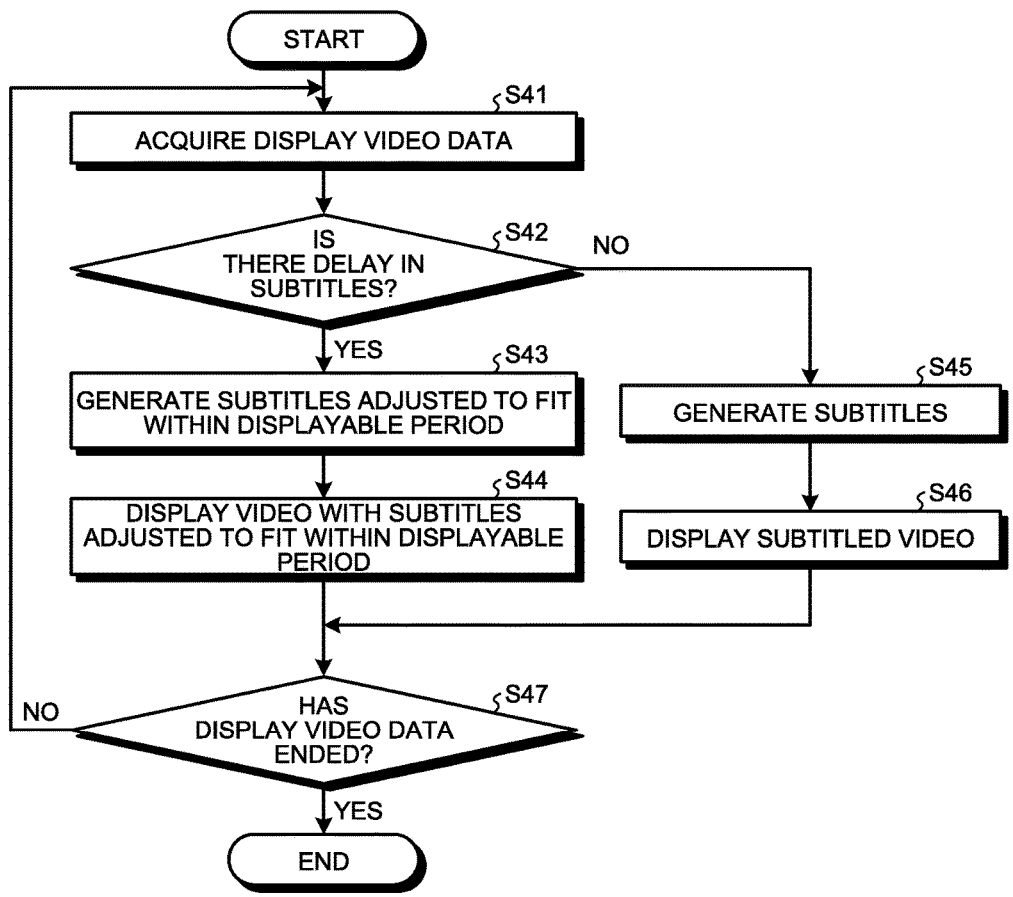
FIG. 13 is a flowchart for explaining an example of the processes by the display of the display system according to the third embodiment.

Explained below with reference to FIGS. 12 and 13 is the display system 1 according to a third embodiment. FIG. 12 is a diagram for explaining an example of the display timings of the subtitles generated/displayed by the display system according to the third embodiment. FIG. 13 is a flowchart for explaining an example of the processes performed by the display of the display system according to the third embodiment. Herein, the display system 1 has an identical fundamental configuration to the display system 1 according to the first and second embodiments. In the display system according to the third embodiment, the processes performed by the subtitle generating unit 34 of the display 30 are different from the processes according to the first and second embodiments.

Based on the display timing information and the display period information of the text data, when it is determined that the subtitles would be delayed, the subtitle generating unit 34 generates subtitle data adjusted to fit within a displayable period D. When it is determined that the subtitles would be delayed, the subtitle generating unit 34 shortens the display period of one or more subtitles. When it is determined that the subtitles would be delayed, the subtitle generating unit 34 can shorten the display periods of the subtitles that include the words with only a high use frequency. In the third embodiment, when it is determined that the subtitles would be delayed, the subtitle generating unit 34 shortens the display periods of the subtitles that include the words with only a high use frequency.

In the third embodiment, a delay in subtitles implies that the display period of the subtitles exceeds the displayable period D. Herein, the displayable period D represents the longest period of time for which the subtitles can be displayed in the video. The displayable period D is set according to the duration of the video. For example, the displayable period D is same as the duration of the video.

Explained below with reference to FIG. 12 is a delay in subtitles. As an example, an explanation is given for the display timings of the subtitles in a case of a live television program. In FIG. 12 is illustrated an example in which the first and second subtitles include words with a low use frequency and have display periods C1 and C2, respectively, set to be longer than a display period C3, thereby resulting in a delay in subtitles. A timing T42 is delayed by the delay period ΔT1 from a timing T41 at which the reproduction of the video and the voices starts. The first subtitle has the display period represented by the display period C1 from the timing T42 to a timing T43. The second subtitle has the display period represented by the display period C2 from the timing T43 to a timing T44. The third subtitle has the display period represented by a display period C3+C4 from the timing T44 to a timing T46. The total display period of the first to third subtitles is exceeding the displayable period D.

In the flowchart illustrated in FIG. 13, the processes performed at Step S41 and Steps S45 to S47 are identical to the processes performed at Step S21 and Steps S22 to S24, respectively, in the flowchart illustrated in FIG. 9.

The display 30 determines whether or not there is a delay in subtitles (Step S42). When the display period of the subtitles is exceeding the displayable period D, then the display 30 determines that there is a delay in subtitles (Yes at Step S42), and the system control proceeds to Step S43. When the display period of the subtitles is not exceeding the displayable period D, then the display 30 determines that there is no delay of in subtitles (No at Step S42), and the system control proceeds to Step S45.

When it is determined that there is a delay in subtitles (Yes at Step S42), the subtitle generating unit 34 of the display 30 generates subtitles that are adjusted to fit within the displayable period D (Step S43). More specifically, the subtitle generating unit 34 of the display 30 generates subtitle data with a shortened display period. In the third embodiment, the subtitle generating unit 34 of the display 30 shortens the display period of the third subtitle that includes the words with only a high use frequency. In the example illustrated in FIG. 12, the display timing of the third subtitle from the timing T44 is shortened to a timing T45, and the display period C3 is set. In other words, the display period of the third subtitle is shortened by the duration corresponding to C4.

The display controller 35 of the display 30 displays the video with the subtitles adjusted to fit within the displayable period D in the display unit 32 (Step S44). More specifically, the display controller 35 of the display 30 displays the display video data and a plurality of sets of the subtitle data according to the display timing information.

As described above, in the third embodiment, when there is a delay in subtitles, the subtitles are adjusted to fit within the displayable period D and are then displayed. As a result, in the third embodiment, it becomes possible to prevent a delay in the display of the subtitles due to making the display period of the words with a low use frequency to be longer than the display period of the words with a high use frequency. According to the third embodiment, even if there is a delay in subtitles, there is no increase in the subtitles to be displayed. Hence, the legibility of the video and the readability of the subtitles can be maintained.

The explanation was given about the display system 1 according to the present application. However, the present application can be implemented using various different illustrative embodiments other than the embodiments described above.

The constituent elements of the display system 1 illustrated in the drawings are merely conceptual, and need not be physically configured as illustrated. That is, the specific configurations of the constituent elements are not limited to the illustrated configurations and the constituent elements, as a whole or in part, can be separated or integrated either functionally or physically based on various types of loads or use condition.

Figure 14:
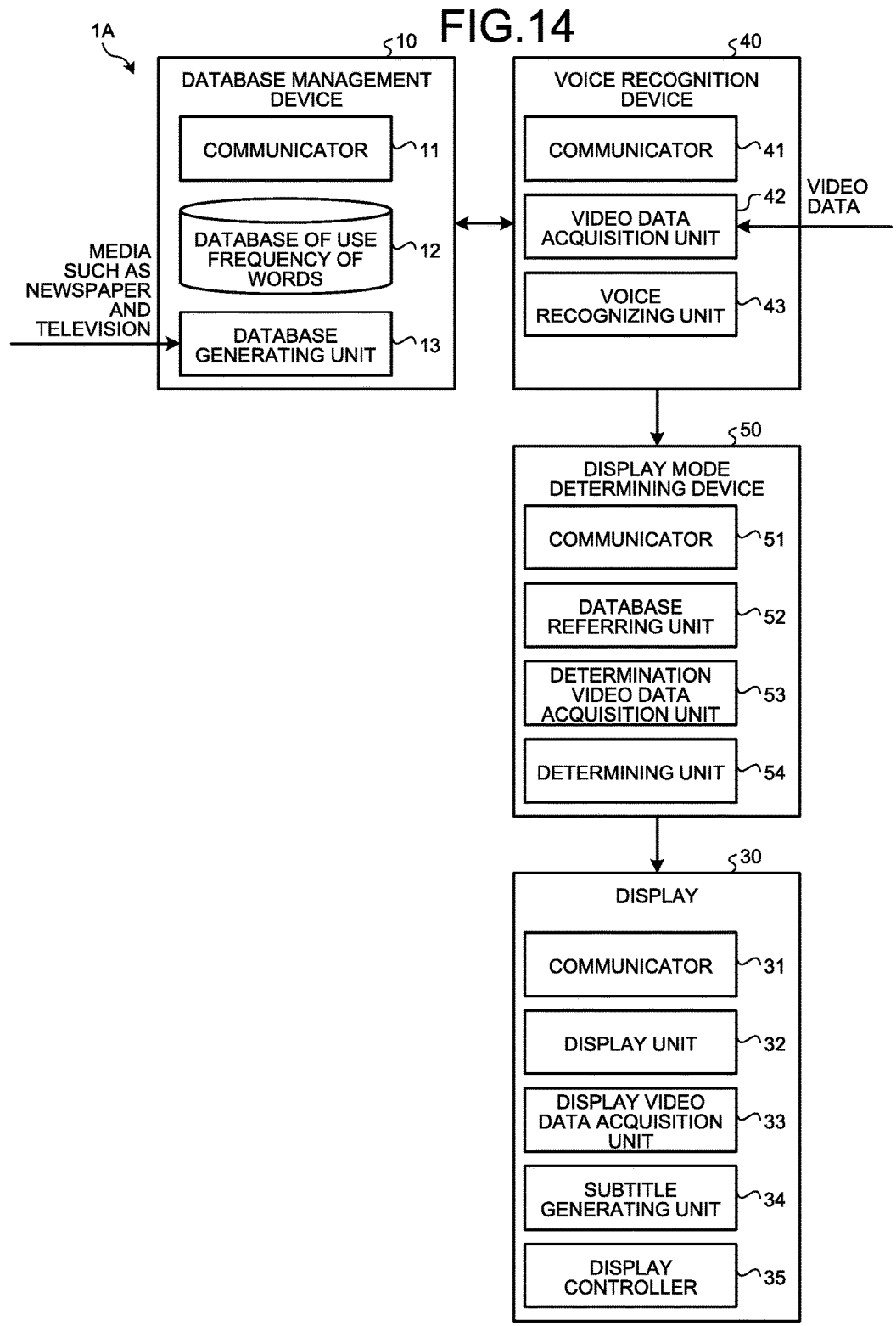
FIG. 14 is a block diagrams illustrating other exemplary configurations of the display system.

Explained below with reference to FIG. 14 is a display system 1A representing a different configuration of the display system 1. FIG. 14 is a block diagram illustrating another exemplary configuration of the display system. The display system 1A includes the database management device 10, the display 30, a voice recognition device 40, and a display mode determining device 50. The database management device 10 and the display 30 have an identical configuration to the first embodiment. The voice recognition device 40 is equipped with the voice recognition function of the display mode determining device 20 according to the first embodiment. The voice recognition device 40 includes a communicator 41, a video data acquisition unit 42, and a voice recognizing unit 43. The display mode determining device 50 is equipped with the same functions, except for the voice recognition function, as the display mode determining device 20 according to the first embodiment. The display mode determining device 50 includes a communicator 51, a database referring unit 52, a determination video data acquisition unit 53, and a determining unit 54. The display mode determining device 50 obtains, from the voice recognition device 40, video data having text data added thereto, and determines the display period of each word according to the corresponding use frequency. As a result of such a configuration, for example, the voice recognition device 40 that is installed in equipment of a video content distribution agency recognizes the voices recorded in a video, the display mode determining device 50 determines the display period of each word in the voices according to the use frequency of that word, and the display video data is delivered to the display 30 of the viewer of the video. The display 30 generates subtitles based on the determined display periods, and displays the subtitles along with the video.

Figure 15:
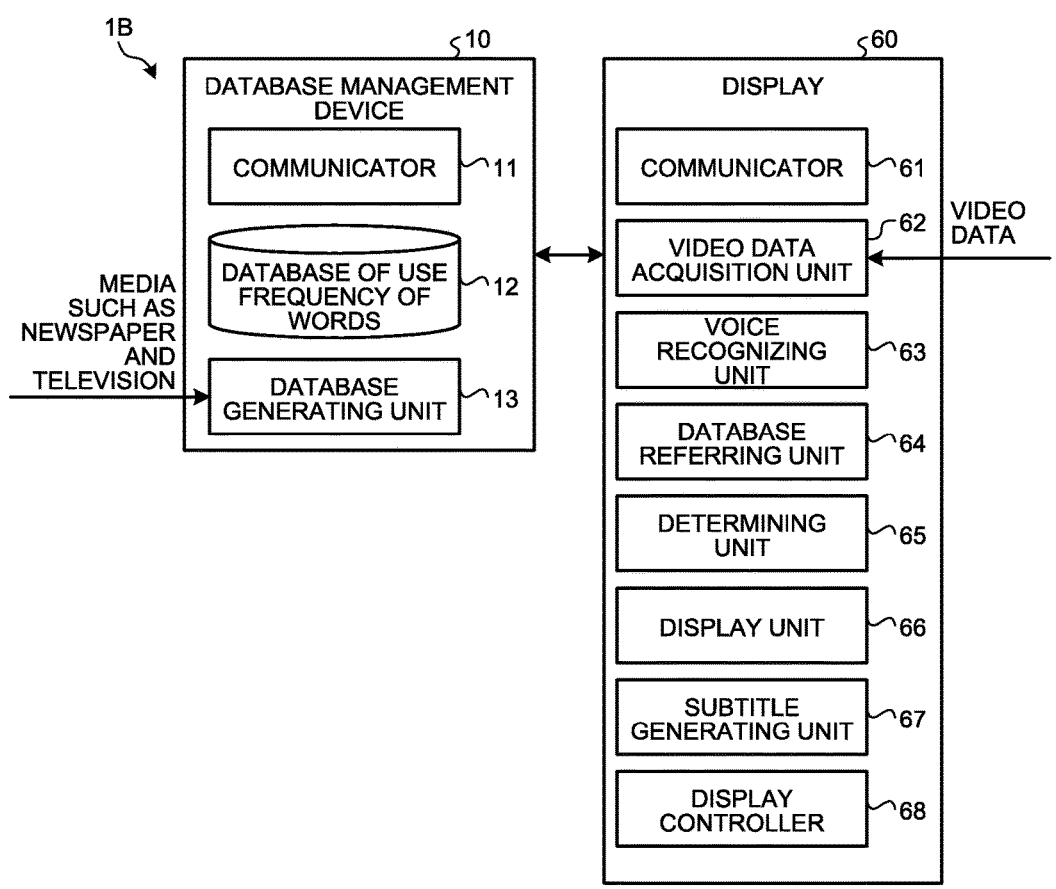
FIG. 15 is a block diagrams illustrating other exemplary configurations of the display system.

Explained below with reference to FIG. 15 is a display system 1B representing a different configuration of the display system 1. FIG. 15 is a block diagram illustrating another exemplary configuration of the display system. The display system 1B includes the database management device 10 and a display 60. The database management device 10 has an identical configuration to the first embodiment. The display 60 is equipped with the functions of the display mode determining device 20 and the display 30 according to the first embodiment. In other words, the display 60 represents the display mode determining device 20 equipped with the functions of the display 30 according to the first embodiment. Alternatively, in other words, the display 60 represents the display 30 equipped with the functions of the display mode determining device 20 according to the first embodiment. The display 60 includes a communicator 61, a video data acquisition unit 62, a voice recognizing unit 63, a database referring unit 64, a determining unit 65, a display unit 66, a subtitle generating unit 67, and a display controller 68. As a result of such a configuration, for example, the display 60 of the viewer of the video determines the display period of each word of the voices recorded in the video according to the use frequency of that word, generates subtitles based on the determined display periods, and displays the subtitles along with the video.

Figure 16:
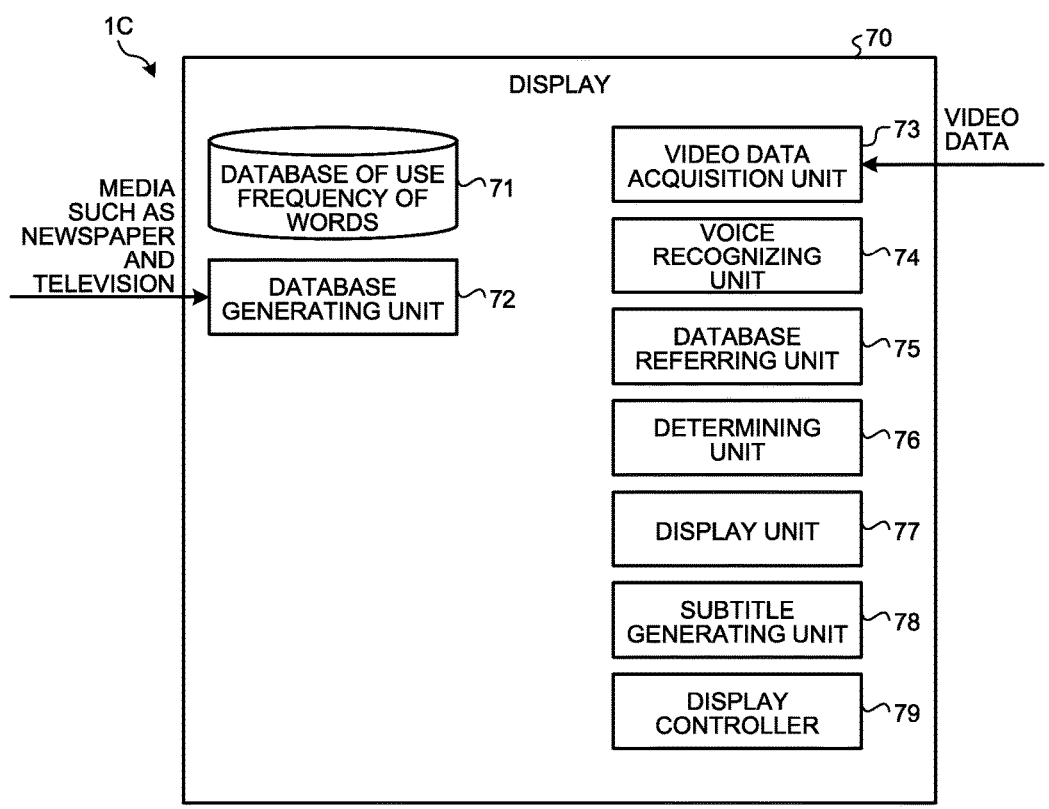
FIG. 16 is a block diagrams illustrating other exemplary configurations of the display system.

Explained below with reference to FIG. 16 is a display system 1C representing a different configuration of the display system 1. FIG. 16 is a block diagram illustrating another exemplary configuration of the display system. The display system 1C includes a display 70 equipped with functions of the database management device 10, the display mode determining device 20, and the display 30 according to the first embodiment. In other words, the display 70 represents the display mode determining device 20 equipped with the functions of the database management device 10 and the display 30 according to the first embodiment. Alternatively, in other words, the display 70 represents the display 30 equipped with the functions of the database management device 10 and the display mode determining device 20 according to the first embodiment. The display 70 includes a database 71, a database generating unit 72, a video data acquisition unit 73, a voice recognizing unit 74, a database referring unit 75, a determining unit 76, a display unit 77, a subtitle generating unit 78, and a display controller 79. In this way, for example, based on the database 71 in which the use frequency of each word is stored, the display 70 of the viewer of the video determines the display period of each word of the voice recorded in the video according to the use frequency of that word, generates subtitles based on the determined display periods, and displays the subtitles along with the video.

For example, the configuration of the display system 1 can be implemented using a program as software loaded in a memory. In the embodiments described above, the explanation is given about the functional blocks implemented using cooperation of hardware and software. That is, the functional blocks can be implemented in various forms using either only hardware, or only software, or a combination of hardware and software.

In the database 12, regarding each word, the use frequency information can be stored that indicates the use frequency of each attribute classification including, for example, category, age group, and country/area. As a result, even for the same word, it becomes possible to store the use frequency of each attribute classification. At the time of obtaining the use frequency of each word in the voices recorded in a video, the use frequency of each word corresponding to the attribute classification of the video can be obtained. Hence, the display periods of the subtitles can be determined in a more appropriate manner.

In the first embodiment, it is explained that the determining unit 25 determines the display period of each text. However, alternatively, the display 30 can determine the display period of each text.

According to an aspect of the present application, it becomes possible to enhance the readability of the subtitles.

Although the application has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A display comprising:
    a display video data acquisition unit configured to acquire display video data of a display video including a voice and acquire text data representing the voice included in the display video;
    a subtitle generating unit configured to generate a subtitle based on the text data acquired by the display video data acquisition unit;
    a display unit configured to display the display video data acquired by the display video data acquisition unit and the subtitle generated by the subtitle generating unit; and
    a display controller configured to perform control so that the display unit displays the display video data acquired by the display video data acquisition unit and the subtitle generated by the subtitle generating unit,
    wherein the display controller is further configured to perform the control so that the display unit displays the subtitle with a display period which has been changed according to use frequency of each word included in the subtitle based on a database of use frequency of words in which use frequency information indicating the use frequency of each word is stored, and wherein the subtitle generating unit is further configured to adjust the display period of the subtitle when the display period of the subtitle exceeds a displayable period during which the subtitle can be displayed for the display video data.

2. A display mode determining method comprising:
    acquiring display video data of a display video including a voice and text data representing the voice included in the display video, resulting in acquired display video data;
    generating a subtitle based on the text data included in the acquired display video data, resulting in a generated subtitle;
    displaying the acquired display video data and the generated subtitle in a display unit; and
    performing control so that the acquired display video data and the generated subtitle are displayed in the display unit, wherein at the performing the control, further performing the control so that the subtitle with a display period which has been changed according to use frequency of each word included in the subtitle, based on a database of use frequency of words in which use frequency information indicating the use frequency of each word is stored is displayed in the display unit, and
    adjusting the display period of the subtitle when the display period of the subtitle exceeds a displayable period during which the subtitle can be displayed for the acquired display video data.

3. A non-transitory storage medium that stores a computer program for causing a computer to execute operations comprising:
    acquiring display video data of a display video including a voice and text data representing the voice included in the display video, resulting in acquired display video data;
    generating a subtitle based on the text data included in the acquired display video data, resulting in a generated subtitle;
    displaying acquired display video data and the generated subtitle, in a display unit; and
    performing control so that the acquired display video data and the generated subtitle are displayed in the display unit, wherein at performing the control, further performing the control so that the generated subtitle, with a display period which has been changed according to a use frequency of each word included in the subtitle, based on a database of use frequency of words in which use frequency information indicating the use frequency of each word is stored is displayed in the display unit, and
    adjusting the display period of the subtitle when the display period of the subtitle exceeds a displayable period during which the subtitle can be displayed for the acquired display video data.

* * * * *